Figure 1:
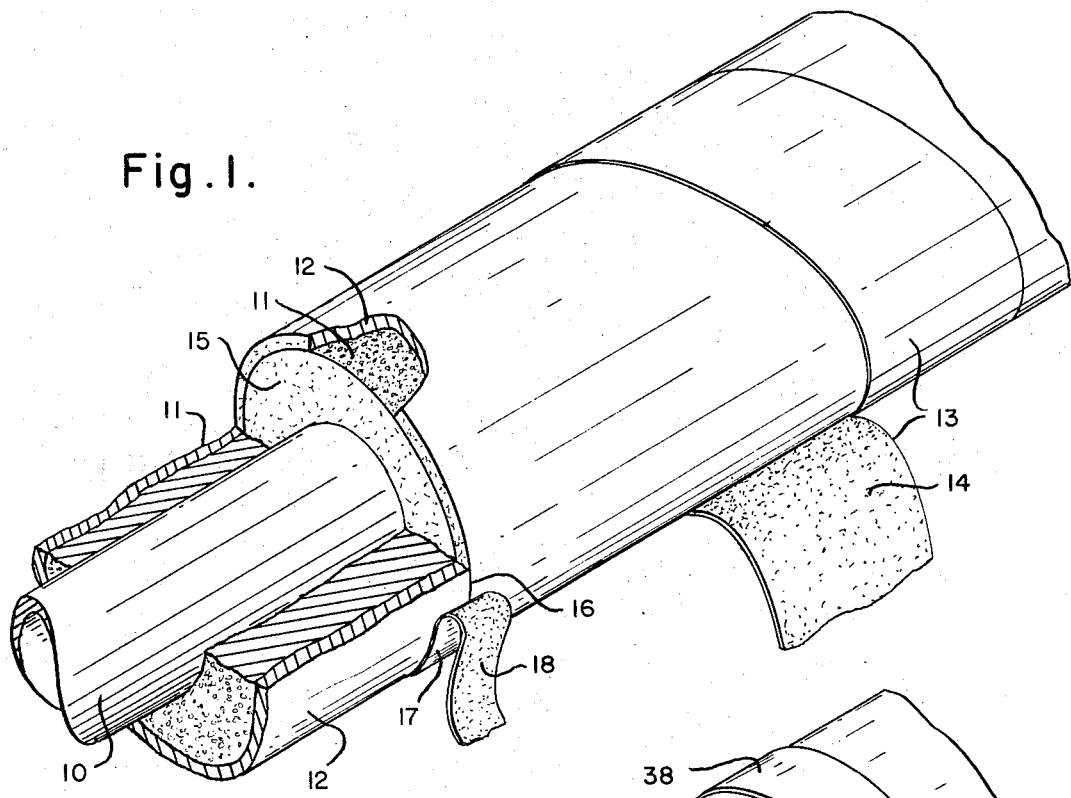

United States Patent [19]
Royston

[11] 3,807,458
[45] Apr. 30, 1974

[54] PIPE COATINGS
[75] Inventor: Louis G. Royston, Pittsburgh, Pa.
[73] Assignee: Rayston Laboratories, Inc., Pittsburgh, Pa.
[22] Filed: Dec. 14, 1970
[21] Appl. No.: 97,772

[52] U.S. Cl. ............ 138/141, 138/145, 138/149, 138/DIG. 9
[51] Int. Cl. ............................................. F16l 59/14
[58] Field of Search .......... 138/140, 141, 143, 148, 138/149, DIG. 9, DIG. 10

[56] References Cited
UNITED STATES PATENTS
| | | | |
|---|---|---|---|
| 3,532,132 | 10/1970 | Rubenstein | 138/141 X |
| 1,811,984 | 6/1931 | Taft | 138/149 |
| 2,969,092 | 1/1961 | Johnston | 138/149 |
| 3,026,223 | 3/1962 | Vanderbilt et al. | 138/141 |
| 3,157,204 | 11/1964 | Phillips | 138/149 X |

Primary Examiner—Meyer Perlin
Assistant Examiner—Ronald C. Capossela
Attorney, Agent, or Firm—Buell, Blenko & Ziesenheim

[57] ABSTRACT

A pipe protecting and insulating coating, a coated pipe and a method of coating pipe are provided in which the coating is essentially a preformed cylinder of foamed resin insulation adapted slidably to fit over a pipe to be protected, a formed cylinder of wood fibers surrounding said cylinder of foamed resin and fixed thereto and an outer layer of metal foil covering and fixed to the outer periphery of the cylinder of wood fibers.

6 Claims, 2 Drawing Figures

PATENTED APR 30 1974

3,807,458

INVENTOR
Louis G. Royston his attorneys

PIPE COATINGS

This invention relates to pipe coatings and particularly to a method of protecting and insulating oil transport lines which are above ground and subject to low temperatures.

There are many problems involved in transporting oil from the field to ships or other destinations in areas subject to extreme cold such as in Alaska and northern Canada. Oil is usually transported from the well to its destination in underground pipe lines. Unfortunately, underground pipe lines cannot be used in much of the northern areas where perma frost is encountered. As a result, pipe lines in such areas must be above ground. Because of the extreme cold, these above ground lines must be insulated so that the oil can be kept flowable within them. Attempts to insulate the above ground pipes with foamed plastics such as polyurethane have met with failure because the deer and caribou consume the plastic from the pipe. To prevent this destruction of the coating, the pipes are wrapped cigarette fashion with flat sheets of foamed plastic mounted on a protective sheet of aluminum and held in place by metal bands. These sheets are hard to form around the pipe at the low temperatures involved, they do not permit independent expansion and contraction of the pipe within the insulation, and they are extremely difficult to seal at the joints.

I have invented a pipe coating and method of coating pipe which eliminates these problems and which can be quickly installed on above ground pipe lines to provide insulation against the cold, as well as protection from external damage by animals, weather and other causes.

Preferably, I provide a preformed cylinder of insulation adapted to slidably fit over a pipe to be protected, a formed cylinder of wood fibers or resin surrounding said cylinder of insulation and fixed thereto, and an outer layer of metal foil fixed to the outer periphery of the cylinder of wood fibers. Preferably, the metal foil is aluminum. The metal foil is preferably applied to the wood fiber cylinder by epoxy resin or similar adhesive material. A pipe line is covered by applying the formed cylinder around the pipe and adhering the joints of adjacent pieces by a pressure sensitive elastomer and a strip of metal foil covered with pressure sensitive elastomer over the outside of each said joint. The formed cylinders may be applied to the pipe by sliding them endwise onto the line as each pipe joint is welded into place, or the cylinders may be cut lengthwise and laid around the pipe and fastened by applying an outer band or by fastening the joint with a pressure sensitive elastomeric adhesive or both, and covering the exterior of the joint with metal foil and pressure sensitive elastomer.

Figure 2:
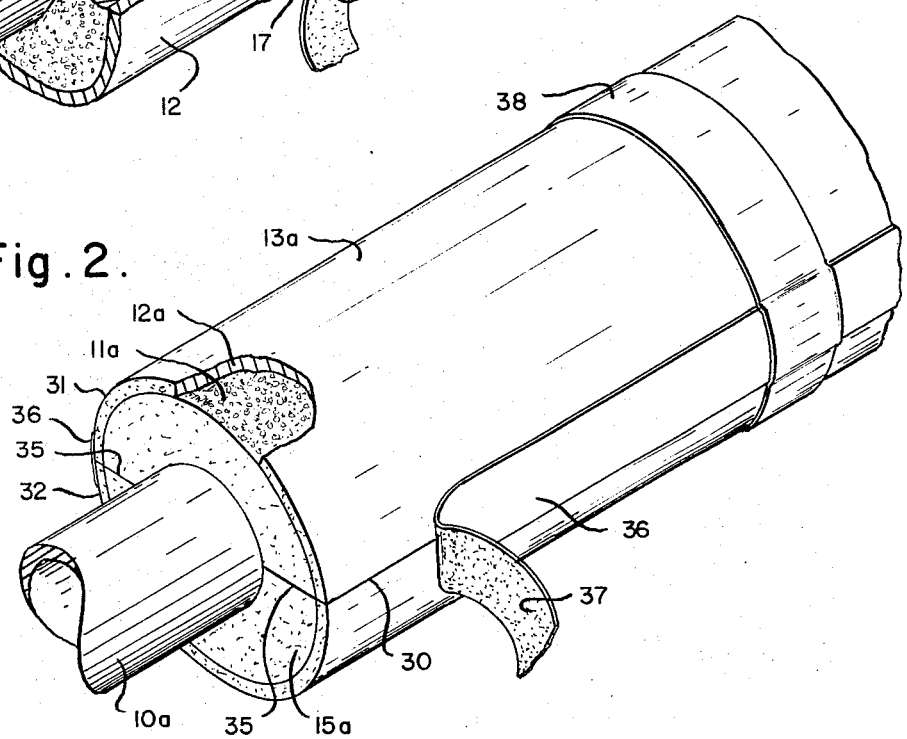

In the foregoing general description of my invention, I have set out certain objects, purposes and advantages to be attained thereby. Other objects, purposes and advantages will be apparent from a consideration of the following description and the accompanying drawings in which:

FIG. 1 is an isometric view, partly cut away of a preferred embodiment of pipe covering according to my invention; and FIG. 2 is an isometric view, partly cut away of a second embodiment of pipe covering according to my invention.

Referring to the drawings, I have illustrated a pipe 10 to be covered. A preformed cover made up of an inner cylinder 11 of preformed foamed polyurethane surrounds the pipe 10 and is slidable thereon. The cylinder 11 of foamed polyurethane is fixed within a cylinder of preformed chip-board 12, made up of wood chips in a matrix of resin, such as a phenolic resin, a melamine resin or the like. An outer protective metal foil 13 surrounds the cylinder of chipboard and is fixed thereto by a layer of epoxy resin 14. The ends of the preformed cover are coated with pressure sensitive elastomer 15 which protects the cylinder against entrance of water into the body of the system and provides an end to end seal for adjacent cylinders. The pressure sensitive elastomer may be an elastomer which is extrudable under pressure and adhesively pressure sensitive and self-sealing such as natural rubber, styrene butadiene rubber, butyl rubber, neoprene, nitrile rubber, polysulfide rubber, ethylene propylene co-polymer, terpolymer and like materials formulated to be soft, conformable and self-sealing. The joints 16 between adjacent cover members is then completed by applying a layer of pressure sensitive elastomer adhesive 15 over the abutting ends, forcing them together and then wrapping a band 17 of metal foil having a layer 18 of pressure sensitive elastomer adhesive thereon. The pressure sensitive elastomer adhesive 18 may be the same as elastomer 15 used to connect and protect the cylinder ends.

In the embodiment shown in FIG. 2, I have illustrated a pipe cover made up precisely as in FIG. 1 with like parts carrying like identifying numerals with the suffix a. The difference between the structures of FIGS. 1 and 2 lies in the fact that in FIG. 2 the cover is cut lengthwise at the diameter of the cylinder on the line 30. The two halves 31 and 32 thus formed are placed over the pipe 10a with the cut edges coated and fastened together with pressure sensitive elastomer adhesive 35. The coating of elastomer adhesive 35 is used also to protect the edge against intrusion of water and is covered by a release sheet for shipment as is also the layer of elastomer 15 on the ends of each cylinder. The exterior of the cut edges is covered by a strip of aluminum foil 36 coated on one side with pressure sensitive elastomer adhesive 37. A band or bands 38 may be placed circumferentially around the outer periphery of the cover to give it additional strength.

The present invention eliminates the problems which have faced the art in respect of covering pipe above ground in those areas where temperatures are extreme and damage from animals is common. The covering of this invention can be applied in a fraction of the time and with a small part of the expense involved in the present system of wrapping a flat sheet of foam having an outer skin of aluminum around a pipe and holder, then wrap in place with bands.

In the foregoing specification, I have set out certain preferred embodiments and practices of my invention, however, it will be obvious that this invention may be otherwise embodied within the scope of the following claims.

I claim:

1. A pipe protecting and insulating coating comprising a preformed cylinder of foamed resin insulation adapted to fit slidably over a pipe to be protected, a preformed cylinder of wood fibers of substantial thickness surrounding said cylinder of foamed resin insulation and fixed thereto and an outer layer of metal foil fixed to the outer periphery of said cylinder of wood fibers by an adhesive resin layer, and wherein the ends of said cylinder are coated with a pressure sensitive elastomer resin layer, and the resin layer is covered by a release sheet.

2. A pipe protecting and insulating coating as claimed in claim 1 wherein the cylinder of foamed resin insulation is formed of foamed polyurethane.

3. A pipe protecting and insulating coating as claimed in claim 1 wherein the cylinder of wood fibers is a cylinder of wood fiber cardboard.

4. A pipe protecting and insulating coating as claimed in claim 1 wherein the cylinder of wood fibers is formed of wood chips and resin.

5. A pipe protecting and insulating coating comprising a preformed cylinder of foamed resin insulation adapted to fit slidably over a pipe to be protected, a preformed cylinder of wood fibers of substantial thickness surrounding said cylinder of foamed resin insulation and fixed thereto and an outer layer of metal foil fixed to the outer periphery of said cylinder of wood fibers by an adhesive resin layer, and wherein the preformed cylinder is cut lengthwise into at least two cylindrical segments and the cut surfaces and end surfaces coated with a pressure sensitive elastomer resin layer, which layer is in turn covered by a release sheet.

6. A coated pipe comprising a metal pipe, a plurality of end to end cylinders of preformed foamed resin insulation slidably surrounding said pipe, a formed cylinder of wood fibers surrounding said preformed foamed resin cylinder and fixed thereto, said cylinder of resin and wood fiber being attached together at their ends by a pressure sensitive elastomer and an outer layer of metal foil surrounding the outer periphery of the cylinder of wood fibers and fixed thereto by a pressure sensitive elastomer.

* * * * *

UNITED STATES PATENT OFFICE
CERTIFICATE OF CORRECTION

Patent No. 3,807,458                  Dated April 30, 1974

Inventor(s)  LOUIS G. ROYSTON

It is certified that error appears in the above-identified patent and that said Letters Patent are hereby corrected as shown below:

The name of the assignee should read:
      Royston Laboratories, Inc.

Signed and sealed this 10th day of September 1974.

(SEAL)
Attest:

McCOY M. GIBSON, JR.                        C. MARSHALL DANN
Attesting Officer                            Commissioner of Patents